Patented July 1, 1952

2,602,089

UNITED STATES PATENT OFFICE 2,602,089

PROCESS OF PREPARING GUAIACYL COMPOUNDS FROM LIGNIN

Irwin A. Pearl, Appleton, Wis., assignor, by mesne assignments, to Sulphite Products Corporation, Appleton, Wis., a corporation of Wisconsin No Drawing. Application November 12, 1949, Serial No. 126,926

6 Claims. (Cl. 260—521)

The present invention relates to the treatment of lignin or lignin substances, and more particularly to an improved process of preparing guaiacyl compounds in high yields from gymnosperm or softwood lignin.

Many processes for degrading lignin or lignin substances with alkali or with alkali in combination with other chemicals including oxidizing agents such as nitrobenzene as well as metallic oxides such as silver, mercury, lead and copper oxides have been reported by various investigators in the art. An illustrative example employing aqueous alkaline-alcoholic reaction mixtures is reported by Brauns et al. in Patent 2,417,346, dated March 11, 1947. An illustrative example employing metallic oxides is found in Angewandte Chemie 53, 450 (1940) where Lautsch et al. without giving complete experimental details, report very low yields (3-5%) of vanillin by oxidation of "Cuproxam" or hydrochloric acid lignin with alkali in the presence of lead, silver, mercury or copper oxide. Another illustrative example is found in J. Am. Chem. Soc. 64, 1429 (1942) where Pearl reports increased yields of vanillin (10-20%) employing alkali and copper oxide or hydroxide.

While the prior art degradation processes have proved fairly satisfactory as far as they go, it has been recognized for some time that they did not go far enough in that they failed to give the desired high yields of guaiacyl compounds. Up until the discoveries leading to the present invention, attempts to improve the yields by varying the reaction conditions such as time and temperature as well as varying the amounts and types of reactants, proved unsuccessful. In some cases with increased temperatures or amounts of oxidizing agents, for example, the degraded products were found not to be of the desired guaiacyl type. In other cases with increased temperatures or amounts of oxidizing agents, some additional lignin degradation of the desired type took place, but as this was accompanied by a relatively high degradation of the degraded products themselves including the guaiacyl compounds, the over-all yields of desired compounds were found to have been decreased rather than increased. Attempts to increase yields of the guaiacyl compounds were also found to result in the formation of relatively large amounts of tarry material, the presence of which in turn was found to materially complicate the isolation and purification of the guaiacyl compounds.

The principal object of the present invention is to provide a commercially practical process of preparing guaiacyl compounds in high yields from gymnosperm lignin or gymnosperm lignin substances.

Another object of the present invention is to provide a process of preparing guaiacyl compounds in a substantially tar-free reaction mixture from which the guaiacyl compounds may be readily isolated and purified.

Other objects of the present invention will be apparent as the description proceeds hereinafter.

After a detailed research investigation, I have discovered that exceptionally high yields of the desired guaiacyl compounds may be readily obtained in a substantially tar-free reaction mixture by digesting a gymnosperm lignin substance in an aqueous reaction mixture with cupric oxide in the presence of excess alkali metal hydroxide and under pressure within a temperature range of 140–200° C. providing the molecular ratio of cupric oxide to unit molecular weight of lignin is 7.1:1 to 24:1. While the complete structure of lignin is as yet unknown, investigations have demonstrated that it is made up of units of methoxylated benzene rings with a unit of gymnosperm or softwood lignin having one methoxyl group or 14.5 per cent methoxyl and a unit molecular weight of about 214. The unit molecular weight is determined by multiplying 100 by 31 (the molecular weight of one $CH_3O$ group) and dividing by 14.5—the percentage of methoxyl in gymnosperm lignins.

With the above ratios of 7.1:1 to 24:1, about 570–1900 parts by weight of cupric oxide should be used with 214 parts by weight of gymnosperm lignin. Investigations show the preferred mole ratio of cupric oxide to gymnosperm lignin to be about 9.5:1 to 16.7:1 or about 760 to 1330 parts by weight of cupric oxide to 214 parts by weight of gymnosperm lignin with a 13:1 ratio or 1050 parts by weight of cupric oxide to 214 parts by weight of gymnosperm lignin and temperatures of 160–180° C. giving the highest yields of desired guaiacyl compounds. Gymnosperm lignin may be obtained from coniferous woods such as pine, spruce, hemlock, fir or other softwoods or from lignin-containing material derived from such woods as for example waste pulping liquors and the like.

The process of the present invention may be used with hardwood lignins, i. e. angiosperm lignin obtained from deciduous trees, providing the molecular ratio of cupric oxide to unit molecular weight of lignin is also 7.1:1 to 24:1. Hardwood lignins contain approximately 20 per cent methoxyl in contrast to the 14.5 per cent methoxyl of softwood lignins, and in addition yield syringyl compounds as well as guaiacyl compounds. As a unit of hardwood lignin contains three methoxy groups and two aromatic nuclei, the unit molecular weight (or equivalent weight in this case) is obtained by multiplying $$100 \text{ by } \frac{93}{2}$$

(the molecular weight of one and one-half $CH_3O$ groups per aromatic nucleus) and dividing by 20—the percentage of methoxyl in hardwood lignins. This gives hardwood lignin a unit molecular weight of 232, and based on the above ratios, about 570–1900 parts by weight of cupric oxide should be used with 232 parts by weight of hardwood lignin. Hardwood lignin may be obtained from deciduous trees such as poplar, oak, beech and other hardwoods or from lignin-containing material derived from such woods. The process of the present invention may also be employed with other angiosperm lignins of the type found in herbaceous species such as bamboo, rye straw, corn cobs, etc. These lignins like the hardwood lignins obtained from deciduous trees contain syringyl groups.

In determining the amount of lignin in lignin material, e. g. lignosulfonate material, the preferred method used is described by Freudenberg, Lautsch and Engler in Berichte der Deutschen Chemischen Gesellschaft, vol. 73B, page 169 (1940). In this method the methoxyl content of the material is determined and the lignin value is calculated from the percent methoxyl in pure lignin of the type tested, e. g. 14.5 per cent for gymnosperm or softwood lignin. For purposes of the present invention gymnosperm lignin is assumed to have 14.5 per cent methoxyl and a unit molecular weight of 214.

The following examples will serve to illustrate the present invention.

Example I

About 240 grams of basic calcium lignosulfonate containing about 144 grams (0.67 mole) of gymnosperm lignin derived form spruce wood, is first placed with 460 grams (11.2 moles) of sodium hydroxide, 862 grams (8.8 moles) of hydrated cupric oxide and about 5 liters of water in an autoclave equipped with a stirrer. The autoclave is then closed, stirring started and heating begun. The temperature of the mixture is raised to about 180° C. during one hour, maintained at about 180° C. for an additional hour and then allowed to cool with stirring. The autoclave is opened and the clear liquor is siphoned from the cuprous oxide sludge. The sludge is filtered and washed with water until free from soluble lignin material. The liquor, filtrate and washings which are substantially free from tarry materials are then combined.

The solution obtained as described above and which contains the desired guaiacyl compounds in addition to other degraded lignin products may be worked up in various ways, one of the preferred being as follows. The solution, which is still alkaline due to the excess alkali in the original reaction mixture, is acidified with sulfuric acid and extracted in a continuous extractor with ether. The ether extract which contains the desired guaiacyl compounds in about a 55 per cent yield based on the lignin, is then fractionated into the sodium bisulfite, sodium bicarbonate and sodium hydroxide soluble fractions by extraction with a 21 per cent aqueous sodium bisulfite solution, then with an 8 per cent aqueous sodium bicarbonate solution and finally with a 5 per cent aqueous sodium hydroxide solution in accordance with the process described in my prior Patent No. 2,431,419 dated November 25, 1947.

Example II

About 2800 grams of substantially sugar-free fermented sulfite waste liquor containing about 72 grams (0.34 mole) of gymnosperm lignin derived from spruce wood is first placed with 115 grams (2.8 moles) of sodium hydroxide and 314 grams (3.2 moles) of hydrated copper oxide in an autoclave equipped with a stirrer. The autoclave is then closed, stirring started and heating begun. The temperature of the mixture is raised to 170° C. during one hour, maintained at about 170° C. for about five hours and then allowed to cool with stirring. The autoclave is opened and the clear liquor is siphoned from the cuprous oxide sludge. The sludge is filtered and washed with water until free from soluble lignin material. The liquor, filtrate and washings are then combined.

The resulting solution is treated as described in Example I except that the solution is acidified with hydrochloric acid and extracted with benzene. The benzene extract containing the desired guaiacyl compounds in about a 51 per cent yield based on the lignin, is then worked up as described in Example I.

The digestion of the lignin should be carried out as mentioned above in a closed container, i. e. under pressure, within the temperature range of 140–200° C. and preferably between about 160–180° C. The time for the reaction to go to completion varies with the temperature, the lower temperatures requiring longer cooking periods, e. g. 5–6 hours, and the higher temperatures requiring shorter cooking periods, e. g. 1–2 hours. The optimum cook for any particular temperature and reaction mixture may be readily ascertained by preliminary experimental test.

The use of a cupric oxide to gymnosperm lignin mole ratio of at least 7.1:1 has been found necessary in order to obtain the desired high yields of guaiacyl compounds. The use of less cupric oxide such as in ratios of 5:1 or 6:1, for example, materially reduces the yield of guaiacyl compounds, and attempts to force the degradation of the lignin in such reaction mixtures by use of higher temperatures as well as with other reagents has proven unsuccessful as well as to result in the formation of large amounts of unwanted tarry materials. The use of greater amounts of cupric oxide than required for the cupric oxide to gymnosperm lignin mole ratio of 24:1 does not provide any additional beneficial results and has been found impractical.

The guaiacyl compounds produced by the present invention are made up of methoxy, hydroxy-substituted benzene ring compounds and comprise for the most part: (a) vanillin (3-methoxy-4-hydroxy-benzaldehyde), (b) 5-carboxyvanillin, (c) vanillic acid (3-methoxy-4-hydroxy-benzoic acid), (d) 5-carboxyvanillic acid, (e) guaiacol (0-methoxy-phenol), (f) acetovanillone (guaiacylmethyl ketone), (g) bisdehydro vanillin and (h) bisdehydro vanillic acid. They are all soluble in organic solvents and may be readily recovered from the aqueous reaction mixture after acidification by extraction with water immiscible organic solvents such as ether and benzene. The bis compounds or dehydro divanillin and divanillic acid separate on standing in a cool ether extract and may be readily recovered in this manner as crystalline solids. Compounds (a) and (b) along with a little of compound (d) are removed by the sodium bisulfite extract, compound (c) and most of compound (d) are removed by the sodium bicarbonate extract and compounds (e) and (f) are removed by the sodium hydroxide extract. The vanillin may be recovered by acidifying the sodium bisulfite extract, extracting the acidified extract with ether, removal of the ether and sublimation of the residue. The acids may be recovered by acidifying the sodium bicarbonate extract, extracting the acidified extract with ether, esterifying the acids in the resulting mixture with a lower aliphatic alcohol and fractional distillation of the resulting esters. The guaiacol and acetovanillone may be recovered by acidfication of the sodium hydroxide extract, extracting the acidified extract with benzene, followed by fractional distillation and crystallization. Alternatively the original alkaline reaction mixture may be extracted with butanol and the butanol extract back washed with dilute alkali to obtain an alkaline solution containing crude vanillin. Acidification of this solution with sulfur dioxide and filtering gives a vanillin solution which may be decomposed with sulfuric acid and extracted with benzene. After removal of the solvent the vanillin may be recovered and purified by distillation or recrystallization or both. Various other means may be employed to fractionate and isolate the guaiacyl compounds present in the reaction mixture or water immiscible solvent extract thereof, and it will be understood that the procedures described above are for illustrative purposes only.

Yields of the desired guaiacyl compounds prepared by the process of the present invention run from about 45 to over 58 per cent, based on the lignin employed. The per cent vanillin present in the guaiacyl compounds varies from about 40 to over 60 per cent depending upon the amount of alkali metal hydroxide employed. The use of large amounts of alkali such as employed in Example I where the sodium hydroxide to lignin ratio is 16.7:1 increases the percentage of vanillin present in the guaiacyl compounds, while the use of relatively small amounts of alkali such as employed in Example II where the ratio of sodium hydroxide to lignin is 8.3:1 increases the percentage of the bisdehydro compounds present in the guaiacyl compounds. While the amounts of alkali employed may thus be varied depending on the guaiacyl compound or compounds desired, sufficient alkali metal hydroxide such as sodium hydroxide or potassium hydroxide or mixtures of the same should be used so that the alkali is present in excess over and above that necessary to maintain the reaction mixture at pH 14 throughout the reaction. As the reaction mixture is relatively clean and the water immiscible solvent extract is substantially free from tar and like materials, isolation and purification of the desired guaiacyl compounds therefrom may be readily accomplished in high yields.

Any gymnosperm lignin substance may be advantageously employed in the preparation of the guaiacyl compounds as hereinbefore disclosed. Examples are gymnosperm lignin remaining after the holo-cellulose content of the wood has been subjected to saccharification; the gymnosperm lignin containing waste from acid or alkaline pulping processes, and gymnosperm lignin containing softwood or woody material in the form of sawdust and the like. It is desirable, however, that the gymnosperm lignin or lignin-containing material be substantially free from cellulose and sugars, and it is for this reason that cellulose-free lignin waste material is preferably used and when using waste pulping liquors as in Example II, that it is preferred to use liquors in which the wood sugars have been removed by fermentation. Ingredients such as the sugars do not do harm to the desired reactions themselves, but as they use up the copper oxide reagent, more reagent must be used if the lignin material is contaminated with sugars or the like.

The present invention provides the art with a commercially practical process for preparing guaiacyl compounds in high yields. As far as known, guaiacyl compounds such as 5-carboxyvanillin, 5-carboxyvanillic acid, bisdehydro vanillic acid, and bisdehydro vanillin have never been prepared heretofore by the oxidation of lignin with copper oxide, and in the case of the last three compounds, by any oxidation of lignin whatsoever. The cupric oxide used in the process of the present invention is readily recovered after recovery of the guaiacyl compounds from the reaction mixture, by roasting the cuprous oxide sludge in air.

I claim:

1. The process of preparing guaiacyl compounds in high yields from a gymnosperm lignin substance which comprises digesting the lignin substance in an aqueous reaction mixture under pressure within a temperature range of about 160–180° C. in the presence of cupric oxide and an excess of alkali metal hydroxide, the molecular ratio of cupric oxide to unit molecular weight of lignin being about 9.5:1 to 16.7:1.

2. The process of preparing guaiacyl compounds in high yields from a gymnosperm lignin substance which comprises digesting the lignin substance in an aqueous reaction mixture under pressure within a temperature range of about 160–180° C. in the presence of cupric oxide and an excess of sodium hydroxide, the molecular ratio of cupric oxide to unit molecular weight of lignin being about 13:1.

3. The process of preparing guaiacyl compounds in high yields from a gymnosperm lignin substance which comprises digesting basic calcium lignosulfonate derived from softwood in an aqueous reaction mixture under pressure within a temperature range of about 160–180° C. in the presence of cupric oxide and an excess of sodium hydroxide, the molecular ratio of cupric oxide to unit molecular weight of gymnosperm lignin in the lignosulfonate being about 9.5:1 to 16.7:1.

4. The process of preparing guaiacyl compounds in high yields from a substantially sugar-free gymnosperm lignin-containing sulfite waste liquor which comprises digesting the sulfite waste liquor in an aqueous reaction mixture under pressure within a temperature range of about 160–180° C. in the presence of cupric oxide and an excess of sodium hydroxide, the molecular ratio of cupric oxide to the unit molecular weight of gymnosperm lignin in the sulfite waste liquor being about 9.5:1 to 16.7:1.

5. The process of preparing 5-carboxyvanillic acid and 5-carboxyvanillin which comprises digesting a gymnosperm lignin substance in an aqueous reaction mixture under pressure within a temperature range of about 140–200° C. in the presence of cupric oxide and an excess of sodium hydroxide, the molecular ratio of cupric oxide to unit molecular weight of gymnosperm lignin being about 9.5:1 to 16.7:1, acidifying the reaction mixture, extracting the acidified reaction mixture with a water immiscible solvent selected from the group consisting of ether and benzene, extracting said water immiscible solvent extract first with aqueous sodium bisulphite solution and second with an aqueous sodium bicarbonate solution and thereafter recovering 5-carboxyvanillin and 5-carboxy-vanillic acid from said sodium bisulphite and sodium bicarbonate extracts.

6. The process of preparing bisdehydro vanillic acid and bisdehydro vanillin which comprises digesting a gymnosperm lignin substance in an aqueous reaction mixture under pressure within a temperature range of about 160–180° C. in the presence of cupric oxide and an excess of sodium hydroxide, the molecular ratio of cupric oxide and sodium hydroxide to the unit molecular weight of gymnosperm lignin being about 9.5:1 to 16.7:1 and about 8.3:1 respectively, acidifying the reaction mixture, extracting the acidified reaction mixture with ether, cooling said ether extract to precipitate said bisdehydro compounds and removing said precipitated bisdehydro compounds from said ether extract.

IRWIN A. PEARL.

REFERENCES CITED

The following references are of record in the file of this patent:

UNITED STATES PATENTS

| Number | Name | Date |
| --- | --- | --- |
| 2,433,227 | Lewis et al. | Dec. 23, 1947 |
| 2,483,559 | Pearl | Oct. 4, 1949 |

OTHER REFERENCES

Freudenberg et al.: Chem. Abs., vol. 34, col. 3913 (1940).

Lautsch et al.: Chem. Abs., vol. 35, col. 849 (1941).

Pearl: J. Am. Chem. Soc., vol. 64, pp. 1429–1431 (1942).